(12) United States Patent
Adzic et al.

(10) Patent No.: US 9,218,380 B2
(45) Date of Patent: Dec. 22, 2015

(54) METHOD AND SYSTEM FOR CARRYING OUT SEARCHES IN A DATABASE COMPRISING TAXONOMIC CLASSIFICATION OF DIGITAL INFORMATION CONTENTS

(75) Inventors: Jovanka Adzic, Turin (IT); Maurizio Belluati, Turin (IT); Giuseppe De Noia, Turin (IT); Valter Fiore, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 754 days.

(21) Appl. No.: 13/519,741

(22) PCT Filed: Dec. 30, 2009

(86) PCT No.: PCT/IT2009/000594
§ 371 (c)(1),
(2), (4) Date: Oct. 16, 2012

(87) PCT Pub. No.: WO2011/080775
PCT Pub. Date: Jul. 7, 2011

(65) Prior Publication Data
US 2013/0031133 A1    Jan. 31, 2013

(51) Int. Cl.
*G06F 17/30* (2006.01)
*H04L 29/08* (2006.01)

(52) U.S. Cl.
CPC .... *G06F 17/30321* (2013.01); *G06F 17/30595* (2013.01); *G06F 17/30864* (2013.01); *H04L 29/08981* (2013.01)

(58) Field of Classification Search
CPC .............. G06F 17/30864; G06F 17/30321; G06F 17/30595; H04L 29/08981
USPC .......................................... 707/802, 801, 778
See application file for complete search history.

(56) References Cited

U.S. PATENT DOCUMENTS

| 4,631,664 | A | * | 12/1986 | Bachman | 707/705 |
| 5,253,361 | A | * | 10/1993 | Thurman et al. | 707/769 |
| 5,303,367 | A | * | 4/1994 | Leenstra et al. | 707/100 |
| 5,592,666 | A | * | 1/1997 | Perez | 707/100 |

(Continued)

FOREIGN PATENT DOCUMENTS

EP    1 677 209 A1    7/2006

OTHER PUBLICATIONS

International Search Report from the European Patent Office for International Application No. PCT/IT2009/000594, mailing date Aug. 5, 2010.

*Primary Examiner* — Shahid Alam
(74) *Attorney, Agent, or Firm* — Oblon, McClelland, Maier & Neustadt, L.L.P.

(57) ABSTRACT

A method for carrying out searches in a database by means of a data processing system is provided. The database includes a first plurality of first data items and a second plurality of second data items, a generic first data item being in relationship with one or more second data items and vice versa. In an internal memory of the data processing system, at least one among a first and a second data table structure are generated, each one including: a first and a second data table, each comprising a plurality of elements, each one corresponding to a respective first, respectively second, data item and univocally identified by a respective first, respectively second, index. The first and second data tables include a third data table including a plurality of elements, each one in a univocal relationship with a respective element of the first and second data tables.

10 Claims, 7 Drawing Sheets

(56) References Cited

U.S. PATENT DOCUMENTS

| | | | |
|---|---|---|---|
| 5,594,898 A | | 1/1997 | Dalal et al. |
| 5,604,899 A | * | 2/1997 | Doktor .......................... 707/769 |
| 5,615,367 A | * | 3/1997 | Bennett et al. ................. 707/803 |
| 5,717,922 A | * | 2/1998 | Hohensee et al. ............ 707/705 |
| 5,991,776 A | | 11/1999 | Bennett et al. |
| 6,112,209 A | | 8/2000 | Gusack |
| 6,356,897 B1 | | 3/2002 | Gusack |
| 6,763,349 B1 | | 7/2004 | Sacco |
| 2005/0240943 A1 | * | 10/2005 | Smith et al. ............. G06F 9/465 719/328 |
| 2009/0303178 A1 | * | 12/2009 | Koda et al. .................... 345/156 |
| 2011/0320400 A1 | * | 12/2011 | Namini ............ G06F 17/30327 707/610 |

* cited by examiner

METHOD AND SYSTEM FOR CARRYING OUT SEARCHES IN A DATABASE COMPRISING TAXONOMIC CLASSIFICATION OF DIGITAL INFORMATION CONTENTS

CROSS REFERENCE TO RELATED APPLICATION

This application is a national phase application based on PCT/IT2009/000594, filed Dec. 30, 2009.

TECHNICAL FIELD

The present invention relates in general to management techniques of digital information contents, like for instance text, music, photos, videos, files of various kind (e.g., computer programs) and the like. Particularly, the present invention concerns a method for navigating, exploring, by a user, databases of digital information contents structured according to hierarchies, such as taxonomies.

DISCUSSION OF THE STATE OF THE TECHNIQUE

The huge amount of information contents in digital format—hereinafter, "contents"—available nowadays for the fruition by users has induced to devise ways for their classifications in the form of databases hierarchically structured, and for the navigation/exploration thereof.

A well-known arrangement used for hierarchically classifying the contents stored in a database exploits the concept of "taxonomy". Briefly, in the digital information technology field, a taxonomy is a tree structure whose nodes corresponds to "concepts" defining particular categories under which the contents of the database can be classified; particularly, each concept of a given taxonomy defines one corresponding category inside which some of the contents stored in the database are classified. The more common relationship between the nodes (concepts) of a taxonomy tree are: "IS-A" and "PART-OF". The node at the highest level in the tree is called "root", and represents the most general concept of the taxonomy; the terminal nodes of the tree are instead called "leaves", and represent the most specific concepts of the taxonomy. In a taxonomy tree, it is possible to have nodes with more than one father.

A same content may be freely classified under more than one concept at any level of abstraction—i.e., at any level of the tree. Moreover, the taxonomy is usually organized into a set of independent sub-trees, each one used for classifying the contents of the database under a different point of view, since a same content may have different independent features.

As it is well known to those skilled in the art, the possible classification relationships occurring among contents of a database and concepts of a hierarchic classification structure such as a taxonomy may be subdivided into three broad types, herein referred to as concept direct classification, concept deep classification and content direct classification. With "concept direct classification under a specific concept C" it is intended a set formed by all the contents E directly classified under such specific concept C; with "concept deep classification under the concept C" it is instead intended a set formed by all the contents E directly classified under such specific concept C together with all the contents E classified under each concept Ci which is a descendent of the concept C in the tree. Finally, with "content direct classification under a specific content E" it is intended a set formed by all the concepts C under which such content E is directly classified. Clearly, the concept deep classifications under a concept C associated to a leaf node exactly coincides with its concept direct classification, being such concept C lacking of descendent concepts Ci.

Generally, in order to access a hierarchically structured database two access paradigms can be employed: the "exact search paradigm" and the "exploration paradigm". These two paradigms are quite different to each other, carry out different purposes and generate different types of results. According to the exact search paradigm, a hierarchically structured database is accessed by users, for example through search engines and database queries, which already know the specific content to be accessed and which are able to specify it in a clear manner. On the contrary, a search in a hierarchically structured database performed according to the exploration paradigm starts from the assumption that users do not know precisely the contents stored in the database, do not know exactly the specific content to be accessed and are unable to specify their access request without assistance. In this document, reference will made to database accesses carried out according to the exploration paradigm.

Accessing a hierarchically structured database following the exploration paradigm—hereinafter, simply "exploring a database"—in an efficient way that is suitable for the direct use of end-users as well as for programmatic or agent-mediated uses is quite complex, especially in case the database comprises a very large amount of contents classified through a really detailed hierarchy of concepts.

This complexity is further exacerbated in case the exploration of the database takes advantage of the so-called "composed concepts" for offering a more efficient service to the users. In a hierarchically structured database, a composed concept is a derivative concept obtained by composing at least two concepts of the taxonomy tree by means of Boolean operators, such as AND, OR and NOT. By correlating more concepts in a single compound concept it is possible to improve the efficiency of the database exploration, allowing to obtain more refined results. However, this improved efficiency strongly increases the complexity of the exploration, since it is quite impossible to previously calculate all the sets of contents classified under the composed concepts because of the extremely huge number of possible composed concepts.

Another way for further improving the efficiency of the database exploration makes use of the so-called "faceted classification", which allows the assignment of multiple classifications to a content, enabling such classifications to be ordered and organized in multiple ways, rather than in a single pre-determined order. The faceted classification makes content access more effective, by providing multiple exploration paths to each content of the database. Even in this case, such improved efficiency strongly increases the complexity of the exploration as the number of contents stored in the database and the complexity of the hierarchy increases.

Several method for managing the exploration of hierarchically structured database are known in the art, which propose different relational schemes between taxonomy concepts and database contents.

The relational scheme used in the Relational On-Line Analytical Processing (ROLAP) systems is a classical multi-dimensional scheme of the star-type. Such star-type scheme includes one de-normalized table for each dimension of the hierarchy; in the middle of the scheme there is one fact table containing facts (contents) and a number of foreign keys linked to each dimension of the hierarchy. In the classical ROLAP based system there is only one classification/association made at leaf level of content for each dimension. In other words, a ROLAP based system is not capable of managing multiple classifications for each dimension of the hierarchy and classifications at any level of the taxonomy tree.

Many commercial Relational DataBase Management Systems (DBMS) provide particular technical solutions for ROLAP based system (e.g., the so-called star-query optimizer) that are suitable for On-Line Analytical Processing (OLAP) operations, which consist in dynamically grouping the facts (contents) along dimensions and doing some aggregating functions on such facts on the relational star-scheme.

There are also solutions based on Multi-dimensional OLAP (MOLAP) systems that pre-compute and store the OLAP grouping and aggregations into particular structures, called cubes, which are optimized multi-dimensional array storage structures (rather than in a relational DBMS).

The solutions based only on RDBMS and star-schema like ROLAP are not capable of offering an efficient exploration service in case the databases are large and are structured according to complex taxonomies. Moreover, also the solutions based on MOLAP are not efficient because of the need of pre-calculating and storing an extremely large number of possible "composed concepts" and related associated contents.

The U.S. Pat. No. 6,763,349 is related to a process of retrieving information in large heterogeneous databases. The process disclosed in the U.S. Pat. No. 6,763,349 provides for initially showing a complete taxonomy for the retrieval, refining the retrieval thought a selection of subsets of interest by selecting concepts in taxonomy and then combining them through Boolean operations. Afterward, said process provides for showing a reduced taxonomy for the selected subset. This main steps are combined through iterative execution of the refining and showing phase. This process provides for the reduction of the overall/complete taxonomy into the selected subset of interest (along iterative actions of user selection of taxonomy concepts). The solution presented in this patent is based on physical storage structures based on bitmap vectors, used not only for operations of retrieving but also for physical storage of classifications/associations between taxonomy concepts and database contents. A bitmap vector stores the bulk of its data as bit arrays (commonly called "bitmaps") and answers most queries by performing bitwise logical operations on these bitmaps.

SUMMARY OF THE INVENTION

In view of the state of the art briefly discussed in the foregoing, the Applicant has tackled the problem of making more efficient the exploration of a database comprising a very high number of digital information contents hierarchically classified under taxonomic categories.

According to an aspect of the present invention, a method for carrying out searches in a database by means of a data processing system is provided. The database includes a first plurality of first data items and a second plurality of second data items; the database is structured to enable a generic first data item to be in relationship with one or more second data items and vice versa. The method comprises based on the database, generating in an internal memory of the data processing system at least one among a first data table structure and a second data table structure. Each one among the first and second data table structures comprises a first data table comprising a plurality of elements each one corresponding to a respective first data item; the elements of the first data table are univocally identified by a respective first index. The first and second data table structures further comprise a second data table comprising a plurality of elements each one corresponding to a respective second data item; the elements of the second data table are univocally identified by a respective second index. The first and second data table structures still further comprise a third data table comprising a plurality of elements each one being in a univocal relationship with a respective element of the first data table and in a univocal relationship with a respective element of the second data table. The method further comprises receiving a search string comprising an identifier of a first data item or of a second data item. If the search string comprises an identifier of a first data item, the method further provides for accessing at least one element of the first data table based on the search string; accessing at least one element of the third data table corresponding to the accessed element of the first data table and retrieving from the accessed element of the third data table the second index of at least one corresponding element of the second data table; accessing the second data table using said second index for extracting a search result. If the search string comprises an identifier of a second data item, the method further comprises accessing at least one element of the second data table based on the search string; accessing at least one element of the third data table corresponding to the accessed element of the second data table and retrieving from the accessed element of the second data table the first index of at least one corresponding element of the first data element; accessing the first data table using said first index for extracting a search result.

According to an embodiment of the present invention the database is structured in such a way the second plurality of second data items is hierarchically arranged.

Moreover, each element of the third data table is univocally identified by a corresponding third index.

If the search string comprises an identifier of a first data item, each element of the first data table comprises at least one respective bound index corresponding to a set of third indexes.

If the search string comprises an identifier of a second data item, each element of the second data table comprises at least one respective bound index corresponding to a set of third indexes.

Said accessing at least one element of the third data table corresponding to the accessed element of the first or second data tables includes accessing the elements of the third data table whose third indexes correspond to the at least one bound index of the accessed element of the first or second data tables.

According to an embodiment of the present invention, the first data items are digital information contents and each second data item defines a respective category of a taxonomic classification; in this case, the database is structured to enable a generic information content to be classified under one or more categories of the taxonomic classification.

Advantageously, the database includes a content table comprising a first ordered sequence of elements each one corresponding to a respective digital information content; a taxonomy table comprising a second ordered sequence of elements each one corresponding to a respective category of the taxonomic classification; a classification table comprising a third ordered sequence of elements each one including an indication of an element of the content table and an indication of an element of the taxonomy table.

According to an embodiment of the present invention, the step of generating at least one among a first data table structure and a second data table structure based on the data structure comprises generating the first data table based on the content table, generating the second data table based on the taxonomy table, and generating the third data table based on the classification table.

Preferably, each element of the first data table is generated based on a respective element of the content table according to the first ordered sequence.

Moreover, each element of the second data table is generated based on a respective element of the taxonomy table according to the second ordered sequence.

Furthermore, the database is stored in an external memory of the data processing system.

According to an embodiment of the present invention, said accessing at least one element of the first data table or of the second data table based on the search string comprises converting said search string into at least one corresponding index of at least one element of the first data table or of the second data table, respectively, based on a hash function.

According to another aspect of the present invention, a corresponding data processing system is provided. The data processing system includes an external memory adapted to store a database including a first plurality of data items and a second plurality of second data items. The database is structured to enable a generic first data item to be in relationship with one or more second data items and vice versa. The data processing system further includes an internal memory adapted to store at least one among a first data table structure and a second data table structure based on the database. Each one among the first and second data table structures comprises a first data table comprising a plurality of elements each one corresponding to a respective data item, the elements of the first data table being univocally identified by a respective first index; a second data table comprising a plurality of elements each one corresponding to a respective second data item, the elements of the second data table being univocally identified by a respective second index and a third data table comprising a plurality of elements each one being in a univocal relationship with a respective element of the first data table and in a univocal relationship with a respective element of the second data table. The data processing system is configured to receive a search string comprising an identifier of a first data item or of a second data item. If the search string comprises an identifier of a first data item, the data processing system is further configured to access at least one element of the first data table based on the search string; access at least one element of the third data table corresponding to the accessed element of the first data table and retrieve from the accessed element of the third data table the second index of at least one corresponding element of the second data table; access the second data table using said second index for extracting a search result. If the search string comprises an identifier of a second data item, the data processing system is further configured to access at least one element of the second data table based on the search string; access at least one element of the third data table corresponding to the accessed element of the second data table and retrieving from the accessed element of the second data table the first index of at least one corresponding element of the first data element; access the first data table using said first index for extracting a search result.

BRIEF DESCRIPTION OF THE DRAWINGS

These and other features and advantages of the present invention will be best understood by reading the following detailed description of some embodiments thereof, given purely by way of a non-limitative example, to be read in conjunction with the accompanying drawings, wherein.

DETAILED DESCRIPTION

Figure 1:
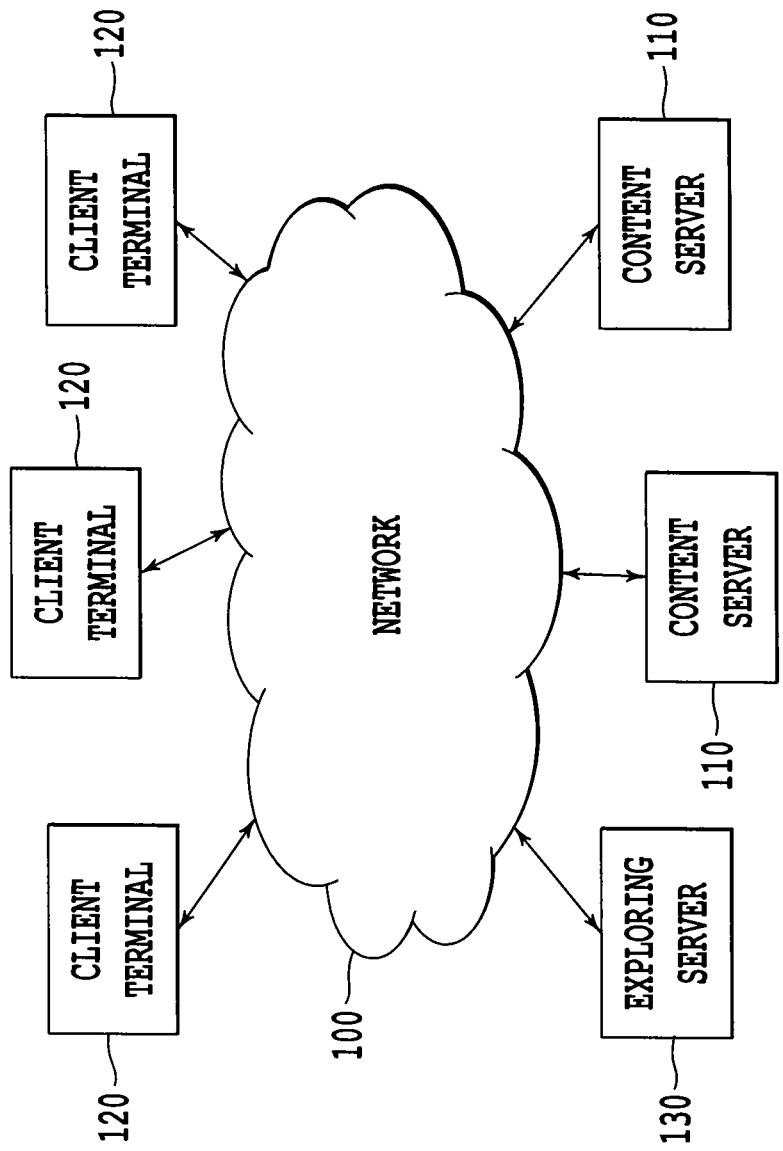
FIG. 1 illustrates a possible scenario in which a method according to an embodiment of the present invention may be applied.

With reference to the drawings, FIG. 1 illustrates a possible scenario in which the method according to an embodiment of the present invention may be applied.

With the numeral reference 100 it is indicated a generic telecommunication network, such as a computer network like the Internet, a Virtual Private Network (VPN), a Wide Area Network (WAN) and a Local Area Network (LAN), adapted to allow data processing apparatuses, such as Personal Computers (PC), server computers, embedded computers and Personal Digital Assistants (PDA), to communicate to each other and exchange data.

Specifically, among the data processing apparatuses interconnected with the network 100 of FIG. 1 there are content servers 110, client terminals 120 and at least one exploring server 130.

The content servers 110 are configured to manage the storing of digital information contents (briefly, "contents"), like for instance text, music, photos, videos, files of various kind and the like, included in a hierarchically structured database or in a collection of hierarchically structured databases. For example, each content server 110 may directly store a respective subset of the contents included in the database, together with associated metadata describing the contents of such subset (e.g., the titles of the contents, a brief description thereof, their filenames and so on), or may only store the metadata associated to such subset, together with identifiers (e.g., URLs) which allow to achieve the actual location of the contents of the subset.

The client terminals 120 represent any device (e.g., PCs provided with suitable client programs adapted to interact with the network 100) with which users can access the database managed by the content servers 110 in order to obtain the contents stored therein.

The database access by the client terminals 120 is carried out through the exploring server 130. As will be described in the following of the present description, the exploring server 130 is configured to store and efficiently manage the hierarchic structure (taxonomy) of the database, and the way the contents of the database are classified under categories defined by taxonomy concepts. The client terminals 120 interact with the exploring server 130 for exploring the contents of the database; in response to a specific query performed by a client terminal 120, the exploring server 130 is configured to provide the client terminal 120 with a list of contents of the database or with a list of concepts defining specific categories under which contents of the database are classified. Particularly, as will be described in detail in the following of the present description, if a client terminal 120 queries the exploring server 130 to provide a list of contents of the database corresponding to one or more specific concepts, the exploring server 130 checks the taxonomy of the database in order to found the concepts specified by the client terminal 120 in its query and accordingly selects a corresponding list including the contents of the database which are classified under the categories defined by such concepts; conversely, if a client terminal 120 queries the exploring server 130 to provide a list of specific concepts corresponding to a specific content of the database, the exploring server 130 looks for such specific content in the database and accordingly retrieve from the taxonomy thereof the concepts defining the categories under which such content is classified.

Figure 2A:
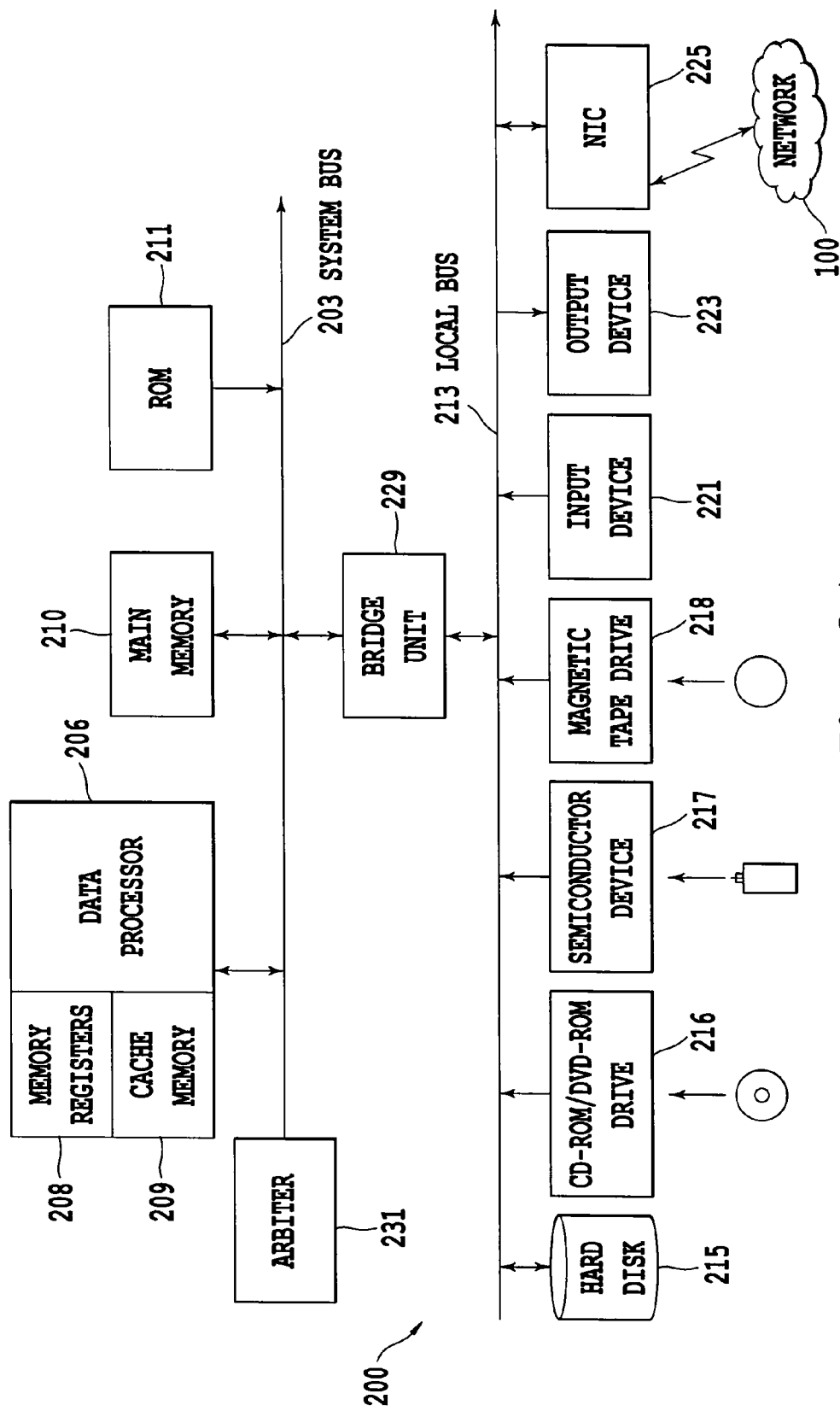
FIG. 2A illustrates the general structure of a data processing apparatus which can be interconnected with a network in the scenario of FIG. 1.

The general structure of one of the data processing apparatuses interconnected with the network 100—such as a content server 110, a client terminal 120 or the exploring server 130—is schematically depicted in FIG. 2A with the reference 200.

The data processing apparatus comprises several units that are connected in parallel to a system bus 203.

One (possibly more) data processor (μp) 206 connected to the system bus 203 controls the operation of the data processing apparatus. An internal memory directly accessible by the data processor 206 is used as a working memory. Particularly, the internal memory may include one or more (possibly, all) of the following units: a set of memory registers 208 and a cache memory 209—e.g., a multi-level hierarchical cache—directly arranged inside the data processor 206, and a main memory 210—e.g., including a set of Random Access Memory (RAM) banks—interfaced with the data processor 206 through the system bus 203. The system bus 203 is further connected to a Read Only Memory (ROM) 211 adapted to store the basic code for a bootstrap of the data processing apparatus.

Peripheral units are connected (by means of respective interfaces) to a local bus 213. Particularly, an external memory not directly accessible by the data processor 206 is used as mass storage for the data processing apparatus; the external memory may include one or more (possibly, all) of the following units: one or more hard disks 215, CD-ROM/DVD-ROM drives 216 for reading CD-ROMs/DVD-ROMs, removable and/or unremovable non-volatile semiconductor devices 217 (such as USB flash drives for reading USB flash storage devices), and magnetic tape drives 218 for reading magnetic tapes. It has to be appreciated that portions of the memory space of one or more of the abovementioned units forming the external memory may be advantageously used as it was an internal memory directly accessible by the data processor 206 by exploiting known virtual memory techniques. Moreover, the data processing apparatus typically includes input devices 221, for example a keyboard and a mouse, and output devices 223, such as a display device (monitor) and a printer. A Network Interface Card (NIC) 225 is used to connect the data processing apparatus to the network 100. A bridge unit 229 interfaces the system bus 203 with the local bus 213. Each microprocessor 206 and the bridge unit 229 can operate as master agents requesting an access to the system bus 203 for transmitting information; an arbiter 231 manages the granting of the access to the system bus 203.

It has to be appreciated that the previously described structure 200 has to be suitably scaled according to the actual function of the data processing apparatus (content server, client terminal or exploring server).

Figure 2B:
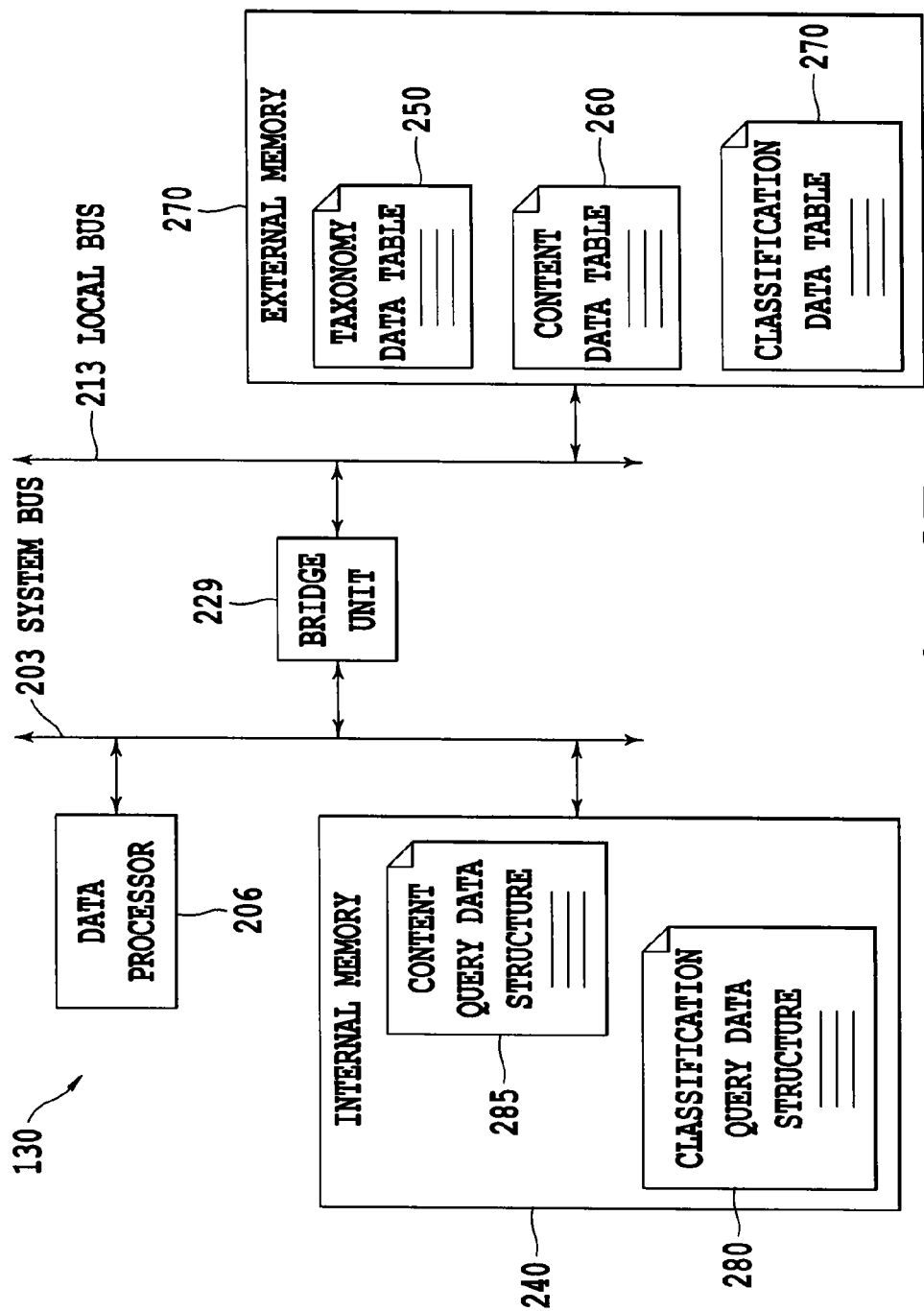
FIG. 2B illustrates a simplified version of the structure of an exploring server of the scenario illustrated in FIG. 1.

FIG. 2B provides a simplified version of the structure of the exploring server 130, in which the internal memory is globally identified with the reference 240 and the external memory is globally identified with the reference 245; the elements corresponding to those already described with reference to FIG. 2A are indicated with the same references.

The exploring server 130 is configured to store in its external memory 245 the hierarchic structure (taxonomy) of the database, the list of the contents included in the database, and the way the contents of the database are classified under taxonomy concepts (hereinafter, the "classification"), in the form of corresponding data tables. Particularly, in a taxonomy data table 250 there are listed the nodes (concepts) forming the tree structure of the taxonomy, together with information detailing how such nodes are hierarchically interconnected to each other; in a content data table 260 there are listed the contents of the database; in a classification data table 270 there are listed the relationships occurring among each content listed in the content data table 260 and a corresponding subset of the concepts listed in the taxonomy data table 250.

Figure 3:
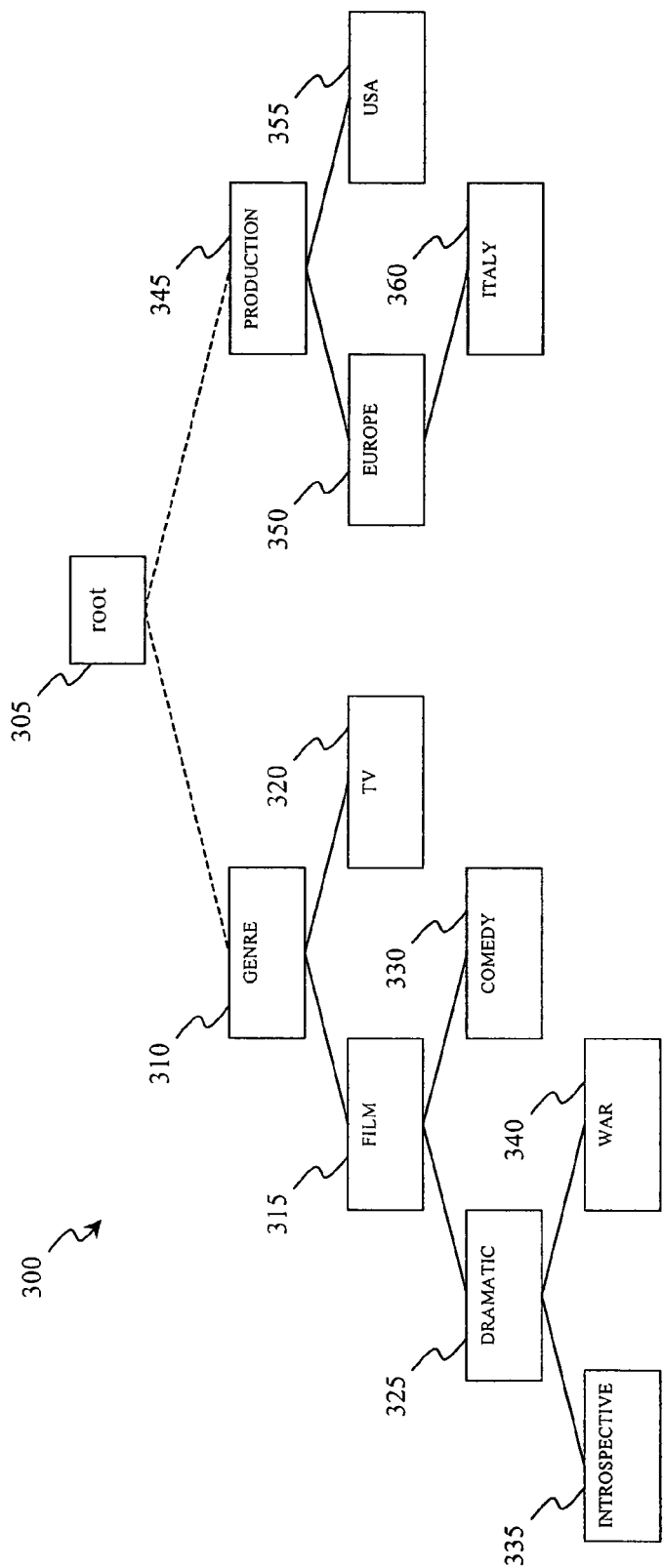
FIG. 3 is a graphical representation of a tree structure of an exemplary taxonomy.

Before to provide a detailed description of the data tables 250, 260 and 270 stored in the external memory 245 of the exploring server 130, reference is made to FIG. 3, which provides a graphical representation of the tree structure of a (very simplified) exemplary taxonomy, identified with the reference 300.

The node at the highest level in the tree is referred to as root node, and it is identified with the reference 305. The root node 305 is an abstract node, in the sense that it is not associated with any specific concept. From the root node 305 fork sub-trees whose respective nodes correspond to actual concepts of the taxonomy.

In the example at issue a first sub-tree includes a node 310 that corresponds to the concept genre. The node 310 is the "father" of a node 315 corresponding to the concept film and of a node 320 corresponding to the concept TV; the same relationship may be expressed considering the nodes 315 and 320 as "sons" of the node 310. Similarly, the concepts film and TV corresponding to the nodes 315 and 320 of the tree are referred to as "son" concepts of the "father" concept genre corresponding to the node 310. The node 315 is the father of further two nodes, and namely a node 325 corresponding to the concept dramatic and a node 330 corresponding to the concept comedy. Moreover, the node 325 is the father of a node 335 corresponding to the concept introspective and a node 340 corresponding to the concept war. The nodes 320, 330, 335 and 340 do not have any child node, and for this reason are called "leaf nodes". A second sub-tree includes a node 345 corresponding to the concept production; such node 345 is the father of a node 350 corresponding to the concept Europe and a node 355 corresponding to the concept Usa. Finally, the node 350 is the father of a node 360 corresponding to the concept Italy. The nodes 355 and 360 are leaf nodes.

Each node of the tree (i.e., each concept of the taxonomy) represents a corresponding category under which the contents of the database may be classified. The set of contents listed under a specific category is said "extension of the category".

The tree structure allows to organize the concepts according to the "IS-A" relationship, with each son concept that is included in the corresponding father concept. For example, the (father) concept dramatic includes the (son) concepts introspective and war, so that a content classified under the category war belongs to the category dramatic as well.

An example of a possible taxonomy data table 250 describing the exemplary taxonomy illustrated in FIG. 3 is the following one:

| concept key | type | depth | father | concept key/concept literal |
|---|---|---|---|---|
| 0 | node | 0 | −1 | 0 (root) |
| 12 | node | 1 | 0 | 12 (genre) |
| 21 | node | 2 | 12 | 21 (film) |
| 28 | node | 3 | 21 | 28 (dramatic) |
| 33 | leaf | 4 | 28 | 33 (introspective) |
| 36 | leaf | 4 | 28 | 36 (war) |
| 64 | leaf | 3 | 21 | 64 (comedy) |
| 68 | leaf | 2 | 12 | 68 (TV) |
| 72 | node | 1 | 0 | 72 (production) |
| 90 | node | 2 | 72 | 90 (Europe) |
| 101 | leaf | 3 | 101 | 101 (Italy) |
| 103 | leaf | 2 | 72 | 103 (USA) |

The taxonomy data table 250 includes a row per each node of the taxonomy (eleven, in the example at issue), and five columns.

The first column, tagged as "concept key", is adapted to store numeric concept keys used to univocally identify the nodes of the tree. The concept keys are assigned to the various nodes forming the tree according to a specific tree-traversing algorithm. For example, starting from the root node 305, which is assigned to the concept key "0", the other nodes of the tree are assigned to increasing concept key values (not necessarily consecutive) following the well-known deep-first algorithm. According to this algorithm, the assignment of the concept keys progresses by selecting the first son node of tree that appears in the tree and thus going deeper and deeper until a leaf node is found; then the assignment backtracks, returning to the most recent node it hasn't selected. It has to be appreciated that said assigning the concept keys according to a specific tree-traversing algorithm makes the concept keys provided with a semantic relevance. On the contrary, the keys usually employed in the database tables do not have any semantic relevance associated therewith, being simple numbers used to access the elements of the table during database management operations. As will be described in the following of the present description, providing such semantic relevance to the concept keys allows to strongly simplify the operations to be performed for the exploration of the database, and improve the overall performances.

The second column, tagged as "type", is adapted to specify if the nodes are leaf nodes or not.

The third column, tagged as "depth", is adapted to store a numeric value depth indicative of the depth of the nodes in the tree with respect to the root node; particularly, the depth of a node is the length of the path (i.e., the number of nodes) to be traversed for reaching the root node. For example, the depth of the node 320 is equal to "2", since such path includes two nodes (the node 310 and the root node 305). The depth of the root node 305 is equal to "0".

The fourth column, tagged as "father", is adapted to store for each node of the tree the concept key of its father node. The root node 305, which does not have any father, is associated to the value "−1".

The fifth column, tagged as "concept key/literal" is adapted to store for each node of the tree the concept key associated to such node together with an alphanumeric strings concept literal providing a brief description of the concepts associated with the nodes. The concept literal of the root node 305, being an abstract node that it is not associated with any specific concept, is simply "root".

Additionally, the taxonomy data table 250 may include further columns adapted to store for each node of the tree information (e.g., keys) adapted to identify which nodes of the tree are sons or siblings of such node.

An example of a possible content data table 260 listing all the contents of a database managed by the content servers 110 is the following one:

| content key | title literal |
|---|---|
| 0 | paths of glory |
| 1 | amici miei |
| 2 | the seventh seal |
| 3 | il caso mattei |
| 4 | apocalypse now |

The content data table 260 includes a row per each content of the database (in the example at issue, five video files of movies), and two columns.

A first column, tagged as "content key", is adapted to store numeric content keys used to univocally identify the nodes of the tree. For example, the content keys are assigned to the various contents of the database following the order in which such contents have been inserted in the database.

A second column, tagged as "title literal", is adapted to store alphanumeric strings title literal providing a brief description of the contents of the database.

An example of a possible classification data table 270 listing the relationships occurring among the contents listed in the content data table 260 and a subset of the concepts listed in the taxonomy data table 250 is the following one:

| content classification | concept classification |
|---|---|
| 0 (paths of glory) | 36 (war) |
| 3 (il caso mattei) | 101 (italy) |
| 1 (amici miei) | 64 (comedy) |
| 1 (amici miei) | 101 (italy) |
| 2 (the seventh seal) | 28 (dramatic) |
| 4 (apocalypse now) | 103 (usa) |
| 3 (il caso mattei) | 90 (europe) |
| 4 (apocalypse now) | 36 (war) |
| 3 (il caso mattei) | 28 (dramatic) |
| 0 (paths of glory) | 90 (europe) |
| 2 (the seventh seal) | 33 (introspective) |

The classification data table 270 includes a first column, tagged "content classification", adapted to store the content keys and the associated title literal strings listed in the content data table 260 and a second column, tagged "concept classification", adapted to store the concept keys and the associated concept literal strings listed in the taxonomy data table 250. Each row of the classification data table 270 establishes an association (classification) between a content of the database—identified by its content keys and its title literal string—and a corresponding concept of the taxonomy—identified by its concept key and its concept literal string.

As already mentioned in the previous, the data tables 250, 260 and 270 are stored in the external memory 245 of the exploring server 130. The updating of such data tables may be performed by the exploring server 130 periodically, for example once a day, and/or every time the exploring server 130 is booted. During the updating, the exploring server 130 checks from the content servers 110 if any content has been added/removed to/from the database, and then accordingly updates the data tables 250, 260 and 270 for reflecting the changes in the database.

A generic client terminal 120 may submit to the exploring server 130 two different types of database access queries, namely a first query type called "classification query" and a second query type called "content query".

The classification query can be viewed as "Given a specific content, find the associated categories under which such content can be classified", while the content query can be viewed as "Given a specific concept, find the associated contents that can be classified under categories corresponding to such concept".

As will be described in detail in the following of the present description, the classification query implies the submission from the client terminal 120 of an input search string adapted to identify a specific content of the database. Based on such search string, the exploring server 130 selects a specific title literal string among those listed in a data table derived from the content table 260 and retrieves the associated content key; then, based on such content key, the exploring server 130 retrieves from a data table derived from the taxonomy table 250 a corresponding concept key of a concept defining a category under which the content associated with the founded title literal string may be classified.

Moreover, the content query implies the submission from the client terminal 120 of an input search string adapted to identify a specific concept of the database. Based on such input string, the exploring server 130 selects a specific concept literal string among those listed in a data table derived from the taxonomy data table 250 and retrieves the associated concept key; then, based on such concept key, the exploring server 130 retrieves from a data table derived from the content data table 260 a corresponding content key of a content that can be classified under the category defined by the concept associated with the founded concept literal string.

According to an embodiment of the present invention, the data structure formed by the data tables 250, 260, 270 and stored in the external memory 245 of the exploring server 130—globally referred to as "external data structures"—is exploited for generating in the internal memory 240 of the exploring server 130 corresponding classification query data structures—globally identified in FIG. 2B with the reference 280—to be exploited for carrying out classification queries submitted by the client terminals 120 and corresponding content query data structures—globally identified in FIG. 2B with the reference 285—to be exploited for carrying out content queries submitted by the client terminals 120.

Figure 5:
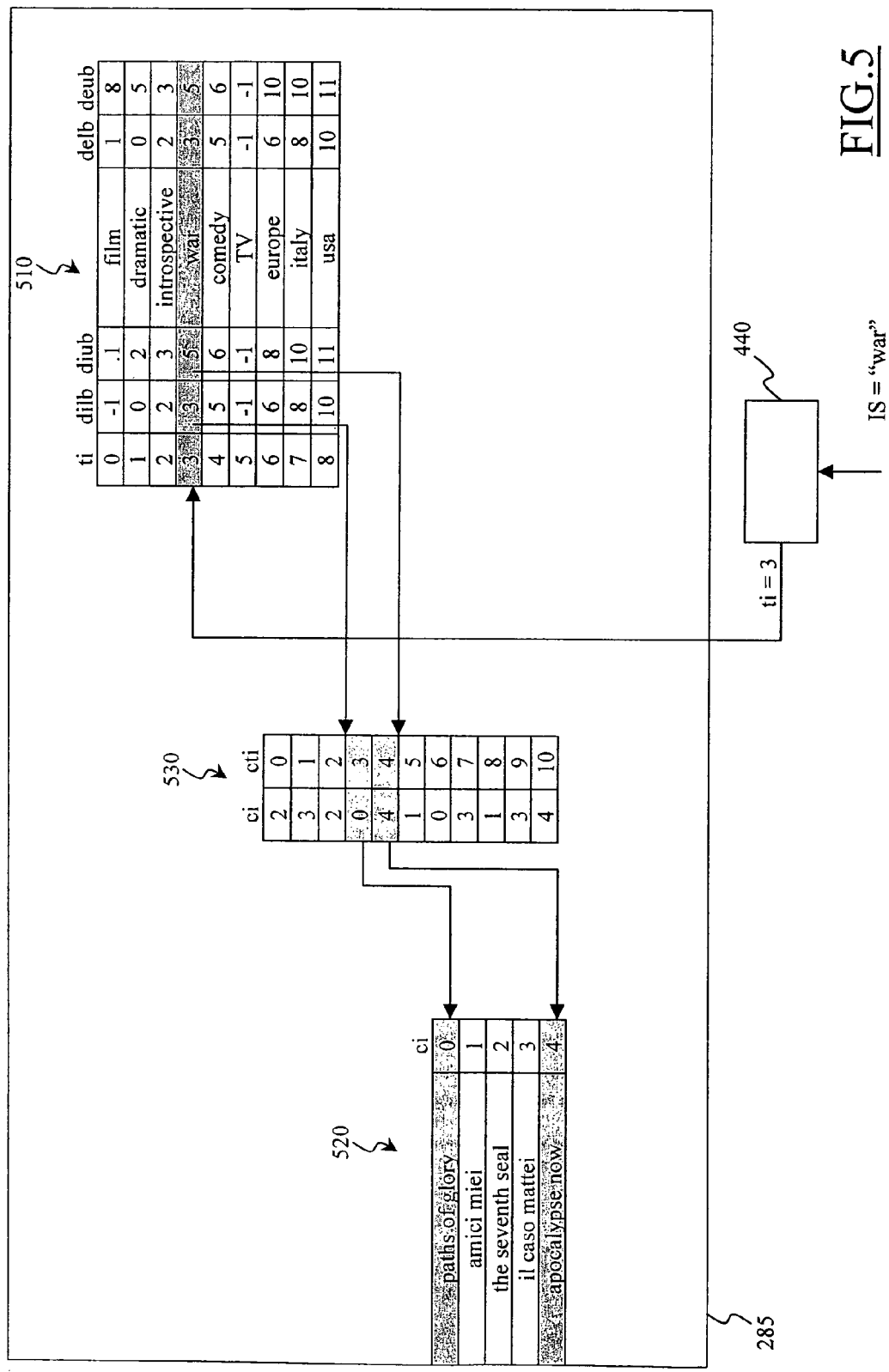
FIG. 5 is a schematic representation of content query data structures generated in an internal memory of the exploring server of FIG. 3 for carrying out content queries according to an embodiment of the present invention.
Figure 6:
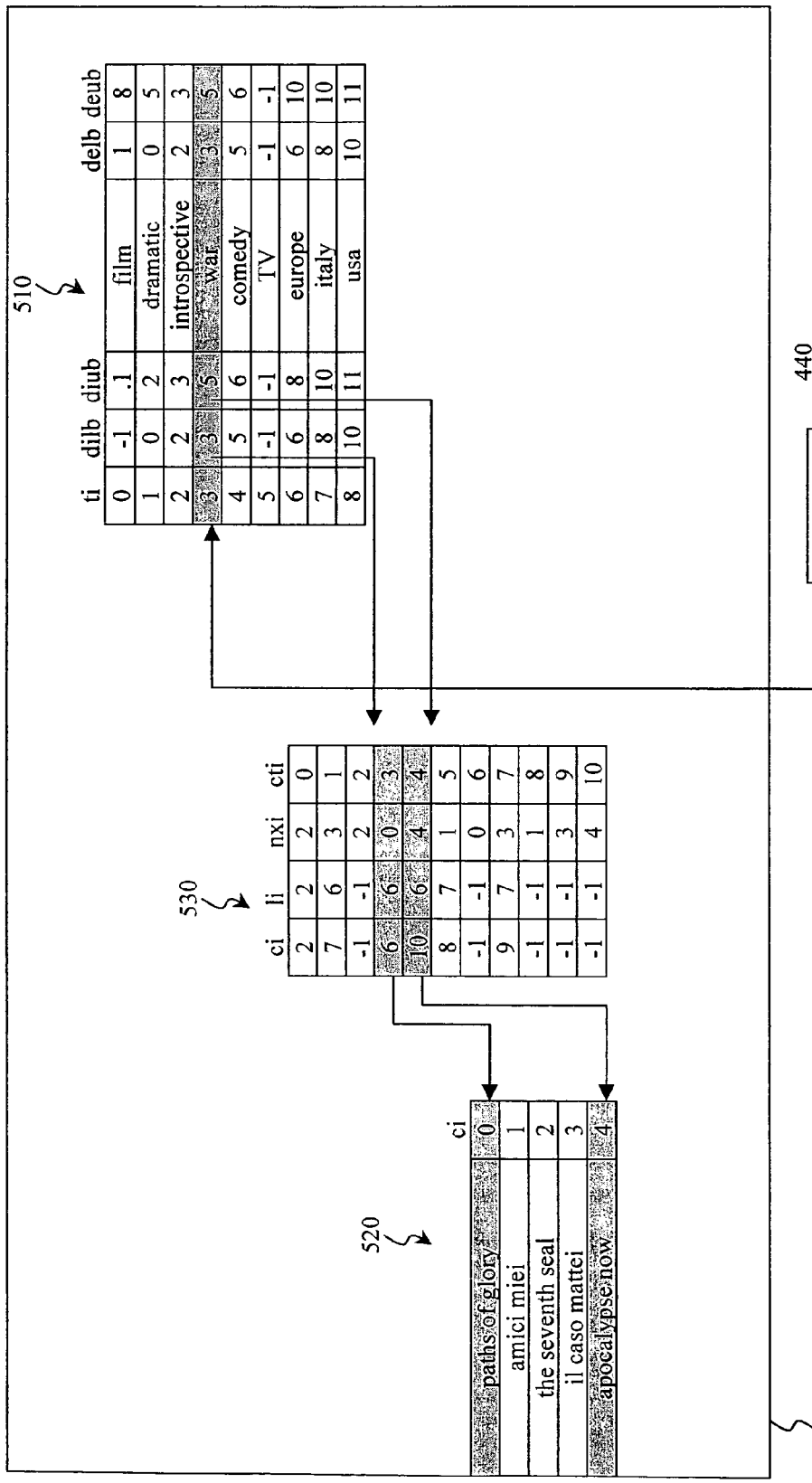
FIG. 6 is a schematic representation of content query data structures generated in an internal memory of the exploring server of FIG. 3 for carrying out content queries according to a further embodiment of the present invention.

The detailed way such classification query data structures 280 and content query data structures 285 are generated and such two database access queries are carried out by the exploring server 130 according to an embodiment of the present invention will be now presented in the following two sections making reference to FIG. 4 (for the classification query) and FIGS. 5-6 (for the content query).

Classification Query

The classification query data structures 280 include a taxonomy table 410, a content table 420 and a so-called taxonomy-by-content array 430.

The generation of such classification query data structures 280 is performed by the exploring server 130 during a loading phase, which may be carried out after each time the data tables 250, 260, 270 in the external memory 245 are updated. Once generated, the classification query data structures 280 remain memorized in the internal memory 240 of the exploring server 130 for being exploited to carry out the classification queries submitted by the client terminal 120.

Basically, the taxonomy table 410 and the content table 420 are internal memory representations of the taxonomy data table 250 and of the content data table 260, respectively.

Particularly, the taxonomy table 410 is generated by selecting a group of the concepts listed in the taxonomy data table 250, and then including in each row of the taxonomy table 410 the concept literal string corresponding to a respective concept among those belonging to the selected group of concepts. The order in which such concept literal strings are stored in the rows of the taxonomy table 410 follows the order in which such concept literal strings are listed in the taxonomy data table 250. Each row of the taxonomy table 410 is identified by a respective increasing index, referred to as taxonomy index $t_i$.

Figure 4:
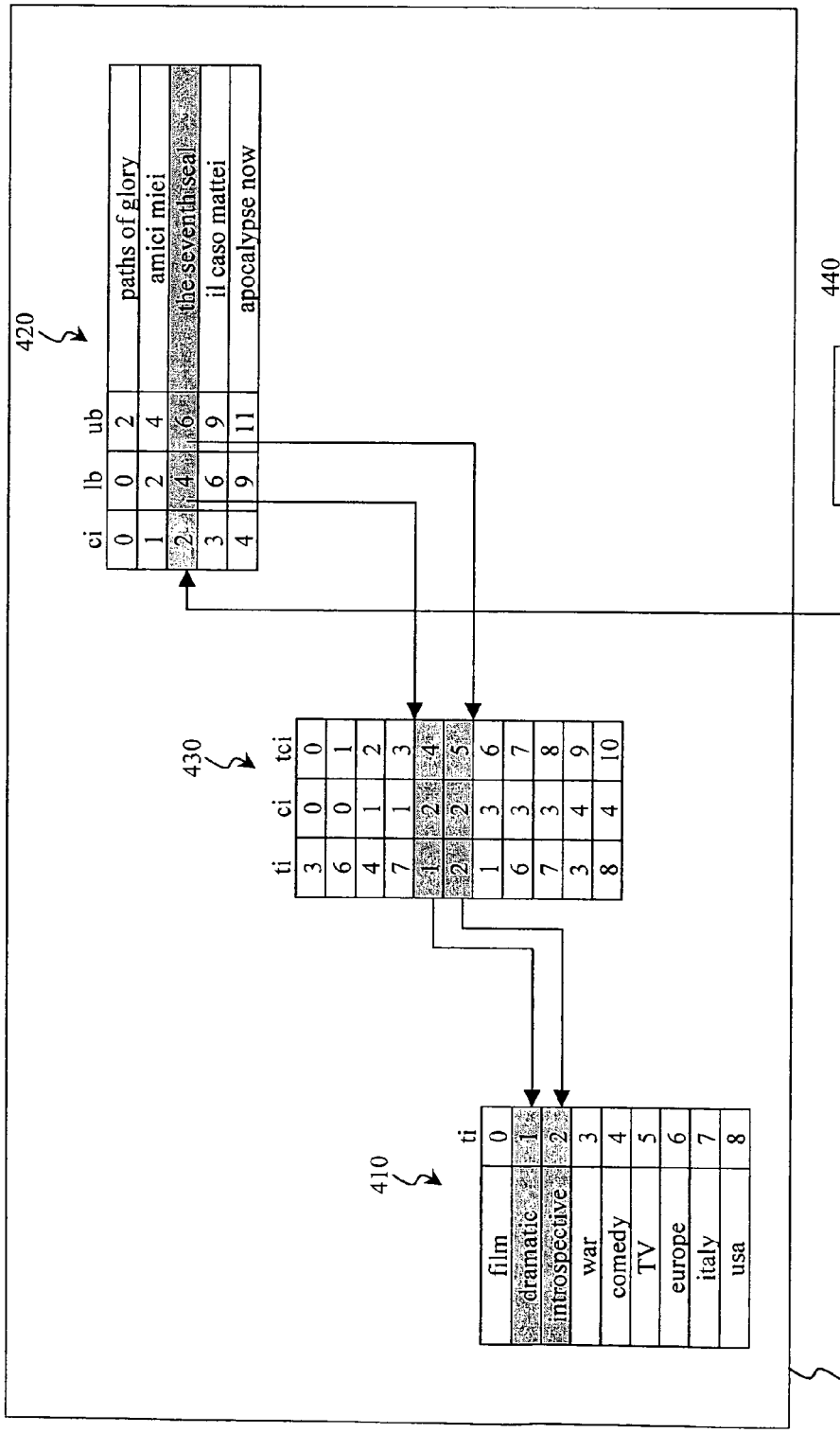
FIG. 4 is a schematic representation of classification query data structures generated in an internal memory of the exploring server of FIG. 3 for carrying out classification queries according to an embodiment of the present invention.

In the example illustrated in FIG. 4, the group of concepts selected from the taxonomy data table is formed by the concepts "film", "dramatic", "introspective", "war", "comedy", "TV", "Europe", "italy", "usa"; the taxonomy index $t_i$ of the row storing the first concept ("film") is equal to "0", the one of the row storing the last concept ("usa") is equal to "8".

Similarly, the content table 420 is generated by selecting a group of the contents listed in the content data table 260, and then including in each row of the content table 420 the title literal string corresponding to a respective content among those belonging to the selected group of contents. The order in which such title literal strings are stored in the rows of the content table 420 follows the order in which such title literal strings are listed in the content data table 260. Each row of the content table 420 is identified by a respective increasing index, referred to as content index $c_i$.

In the example illustrated in FIG. 4, the group of contents selected from the content data table is formed by the contents "paths of glory", "amici miei", "the seventh seal", "il caso mattei" and "apocalypse now"; the content index $c_i$ of the row storing the first content ("paths of glory") is equal to "0", the one of the row storing the last content ("apocalypse now") is equal to "4". It has to be appreciated that in this exemplary case, wherein the selected group of contents coincides with the totality of the contents listed in the content data table 260, the content indexes $c_i$ coincide to the content keys of the contents listed in the content data table 260.

Each row of the content table 420 is further adapted to store a pair of respective bound indexes, namely a lower bound index lb and an upper bound index ub, whose purpose will be described in the following.

The taxonomy-by-content array 430 is instead a classification query data structure 280 derived from the classification data table 270 stored in the external memory 245 of the exploring server 130. Each row of the taxonomy-by-content array 430—which is identified by a respective increasing index, referred to as taxonomy-by-content index $tci$—is adapted to store the taxonomy index $t_i$ of a taxonomy table 410 row. Each row of the taxonomy-by-content array 430 is used to establish an association between a row of the content table 420 identified by a content index $c_i$ and a corresponding row of the taxonomy table 410 identified by the taxonomy index $t_i$ stored therein.

This association pairs $c_i$-$t_i$ are determined based on the content/concept associations listed in the classification data table 270.

Particularly, the exploring server 130 reads the classification data table 270 stored in the external memory 245, and then reorders the rows thereof mainly by increasing content keys and secondly by increasing concept keys. The classification data table 270 of the example at issue is thus ordered in the following way:

| content classification | concept classification |
| --- | --- |
| 0 (paths of glory) | 36 (war) |
| 0 (paths of glory) | 90 (europe) |
| 1 (amid miei) | 64 (comedy) |
| 1 (amid miei) | 101 (italy) |
| 2 (the seventh seal) | 28 (dramatic) |
| 2 (the seventh seal) | 33 (introspective) |
| 3 (il caso mattei) | 28 (dramatic) |
| 3 (il caso mattei) | 90 (europe) |
| 3 (il caso mattei) | 101 (italy) |
| 4 (apocalypse now) | 36 (war) |
| 4 (apocalypse now) | 103 (usa) |

At this point, the association pairs ci-ti in the taxonomy-by-content array 430 are determined by taking the rows of the ordered classification table 270 which include the selected content-concept pairs following the listing order used therein.

Thus, making reference to the example at issue:
- the first row of the taxonomy-by-content array 430 (tci="0") corresponds to the pair ci="0" (corresponding to the content "path of glory"), ti="3" (corresponding to the concept "war");
- the second row of the taxonomy-by-content array 430 (tci="1") corresponds to the pair ci="0" (corresponding to the content "path of glory"), ti="6" (corresponding to the concept "europe");
- the third row of the taxonomy-by-content array 430 (tci="2") corresponds to the pair ci="1" (corresponding to the content "amici miei"), ti="7" (corresponding to the concept "italy"), and so on.

It has to be observed that each content (i.e., each row of the content table 420) is associated with a number of (consecutive) rows in the taxonomy-by-content array 430 equal to the number of possible categories under which such concept can be classified.

Once the taxonomy-by-content array 430 has been created, the lower bound index lb and the upper bound index ub of each row of the content table 420 are generated in the following way.

The lower bound index lb of each row of the content table 420 identified by a content index ci is set equal to the lower taxonomy-by-content index tci of the taxonomy-by-content array 430 which identifies a taxonomy-by-content array 430 row corresponding to such content index ci. The higher bound index hb of each row of the content table 420 identified by a content index ci is instead set equal to one plus the higher taxonomy-by-content index tci of the taxonomy-by-content array 430 which identifies a taxonomy-by-content array 430 row corresponding to such content index ci.

Thus, making reference to the example at issue:
- the first row of the content table 420 (ci="0") has the lower bound index lb equal to "0", and the higher bound index hb equal to "2";
- the second row of the content table 420 (ci="1") has the lower bound index lb equal to "2", and the higher bound index hb equal to "4";
- the third row of the content table 420 (ci="2") has the lower bound index lb equal to "4", and the higher bound index hb equal to "6", and so on.

When a client terminal 120 submits a classification query to the exploring server 130 in order to obtain the classification of a specific content in the database, the client terminal 120 submits an input search string IS from which it is possible to retrieve such specific content, e.g., a string corresponding to the title literal string of the content.

For example, if an user of the client terminal 120 desires to retrieve the categories under which the movie "the seventh seal" is classified in the database, such input search string IS may be "seventh seal".

The submitted input search string IS is used by the exploring server 130 for selecting a specific content among those listed in the content table 420. For example, the input search string IS may be used as a hash key adapted to be converted, through a proper hash function implemented by the exploring server 130 and schematically illustrated in FIG. 4 with a functional block 440, into a corresponding content index ci of the content table 420.

In the example at issue, the hash function 440 is configured to convert the input search string "seventh seal" into the content index ci="2" identifying the third row of the content table 420, which is associated with the content "the seventh seal".

Then, a corresponding set of taxonomy indexes ti of the taxonomy table 410 is selected exploiting the lower bound index lb and the upper bound index ub stored in the row of the content table 420 identified by the retrieved content index ci. Particularly, such selected set of taxonomy indexes ti is determined by selecting the set of rows of the taxonomy-by-content array 430 whose taxonomy-by-content indexes tci are comprised within the interval defined by lb and ub −1.

In the example at issue, the third row of the content table 420 identified by the content index ci="2" has a lower bound index lb equal to "4" and an upper bound index ub equal to "6". Thus, the selected set of rows of the taxonomy-by-content array 430 starts from the row whose taxonomy-by-content index tci is equal to lb="4" and ends to the row whose taxonomy-by-content index tci is equal to ub −1="5".

Finally, the requested classifications of the content submitted through the query by the client terminal 120 are retrieved by listing the concept literal strings stored in the set of rows of the taxonomy table 410 which is identified by the taxonomy indexes ti stored in the selected set of rows of the taxonomy-by-content array 430.

In the example at issue, the row of the taxonomy-by-content array 430 identified by the taxonomy-by-content index tci="4" stores the taxonomy index ti="1", while the row of the taxonomy-by-content array 430 identified by the taxonomy-by-content index tci="5" stores the taxonomy index ti="2". Thus, the classification of the content "the seventh seal" comprises the categories corresponding to the concept whose concept literal string is "dramatic" (ti="1") and to the concept whose concept literal string is "introspective" (ti="2").

The retrieved concept literal strings are then provided to the client terminal 120 which has submitted the classification query.

The above-described operations performed by the exploring server 130 for carrying out a classification query submitted by a client terminal 120 may be reassumed with the following pseudo-code:

```
ci = convert (IS);
for (j = content_table[ci].lb, j < content_table[ci].ub; j++)
{
    ti = taxonomy_by_content[j];
    category = taxonomy_table[ti].concept_literal
}
``` wherein convert( ) is the function that converts the submitted input search string IS into a corresponding content index ci of the content table 420 (e.g., the hash function 440), content_table[ci].lb is the lower bound index lb of the row of the content table 420 identified by the content index ci, content_table[ci].ub is the upper bound index ub of the row of the content table 420 identified by the content index ci, taxonomyby_content[j] is the taxonomy index ti stored in the row of the taxonomy-by-content table 430 identified by the taxonomy-by-content index tci=j and taxonomy_table[ti].concept_literal is the concept literal string stored in the taxonomy table 410 row identified by the taxonomy index ti.

Content Query

The content query data structures 285 include a taxonomy table 510, a content table 520 and a so-called content-by-taxonomy array 530.

Similarly to the case of the classification query data structures 280, the generation of the content query data structures 285 is performed by the exploring server 130 during a loading phase, which may be carried out after each time the data tables 250, 260, 270 in the external memory 245 are updated. Once generated, the content query data structures 285 remain memorized in the internal memory 240 of the exploring server 130 for being exploited to carry out the content queries submitted by the client terminal 120.

Even in this case, the taxonomy table 510 and the content table 520 are internal memory representations of the taxonomy data table 250 and of the content data table 260, respectively.

Particularly, the content table 520 is generated in the same way as the content table 420 of the classification query data structures 280, with the only difference that the content table 520 is lacking of fields for storing the lower bound index lb and the upper bound index ub. For this reason its detailed description will be omitted for the sake of the conciseness.

Moreover, the taxonomy table 510 as well is generated in the same way as the taxonomy table 410 of the classification query data structures 280, and its detailed description will be omitted for the sake of the conciseness. However, unlike the the taxonomy table 410, each row of the taxonomy table 510 is further adapted to store a pair of respective direct bound indexes—namely a direct lower bound index dilb and a direct upper bound index diub. The purpose of such indexes will be described in the following.

Like the taxonomy-by-content array 430, the content-by-taxonomy array 530 is a content query data structure 285 derived from the classification data table 270 stored in the external memory 245 of the exploring server 130. Each row of the content-by-taxonomy array 530—which is identified by a respective increasing index, referred to as content-by-taxonomy index cti—is adapted to store the content index ci of a content table 520 row. Each row of the content-by-taxonomy array 530 is used to establish an association between a row of the taxonomy table 510 identified by a taxonomy index ti and a corresponding row of the content table 520 identified by the content index ci stored therein.

This association pairs ti-ci are determined based on the concept/content associations listed in the classification data table 270.

Particularly, the exploring server 130 reads the classification data table 270 stored in the external memory 245, and then reorders the rows thereof mainly by increasing concept keys and secondly by increasing content keys. The classification data table 270 of the example at issue is thus ordered in the following way:

| concept classification | content classification |
|---|---|
| 28 (dramatic) | 2 (the seventh seal) |
| 28 (dramatic) | 3 (il caso mattei) |
| 33 (introspective) | 2 (the seventh seal) |

-continued

| concept classification | content classification |
|---|---|
| 36 (war) | 0 (paths of glory) |
| 36 (war) | 4 (apocalypse now) |
| 64 (comedy) | 1 (amici miei) |
| 90 (europe) | 0 (paths of glory) |
| 90 (europe) | 3 (il caso mattei) |
| 101 (italy) | 1 (amici miei) |
| 101 (italy) | 3 (il caso mattei) |
| 103 (usa) | 4 (apocalypse now) |

At this point, the association pairs ti-ci in the content-by-taxonomy array 530 are determined by taking the rows of the ordered classification table 270 which include the selected concept-content pairs following the listing order used therein.

Thus, making reference to the example at issue:
the first row of the content-by-taxonomy array 530 (cti="0") corresponds to the pair ti="1" (corresponding to the concept "dramatic"), ci="2" (corresponding to the content "path of glory");
the second row of the content-by-taxonomy array 530 (cti="1") corresponds to the pair ti="1" (corresponding to the concept "dramatic"), ci="3" (corresponding to the content "il caso mattei");
the third row of the content-by-taxonomy array 530 (cti="2") corresponds to the pair ti="4" (corresponding to the concept "introspective"), ci="2" (corresponding to the content "the seventh seal"),
and so on.

It has to be observed that each concept (i.e., each row of the taxonomy table 510) is associated with a number of (consecutive) rows in the content-by-taxonomy array 530 equal to the number of contents that are classified under the category defined by such concept.

Once the content-by-taxonomy array 530 has been created the direct lower bound index dilb and the direct upper bound index diub of each row of the taxonomy table 510 are generated in the following way.

The direct lower bound index dilb of each row of the taxonomy table 510 identified by a taxonomy index ti is set equal to the lower content-by-taxonomy index cti of the content-by-taxonomy array 530 which identifies a content-by-taxonomy array 530 row corresponding to such taxonomy index ti. The direct upper bound index diub of each row of the taxonomy table identified by a taxonomy index ti is instead set equal to one plus the higher content-by-taxonomy index cti of the content-by-taxonomy array 530 which identifies a content-by-taxonomy array 530 row corresponding to such taxonomy index ti. The direct lower bound index dilb and the direct upper bound index diub of a row of the taxonomy table 510 corresponding to a concept defining a category under which no content has been chosen to be classified are set to "−1".

Thus, making reference to the example at issue:
the first row of the taxonomy table 510 (ti="0") has the direct lower bound index dilb equal to "−1", and the direct upper bound index diub equal to "−1";
the second row of the taxonomy table 510 (ti="1") has the he direct lower bound index dilb equal to "0", and the direct upper bound index diub equal to "2";
the third row of the taxonomy table 510 (ti="2") has the direct lower bound index dilb equal to "2", and the direct upper bound index diub equal to "3",
and so on.

When a client terminal 120 submits a content query to the exploring server 130 in order to obtain the contents that are directly classified under a category defined by a specific concept of the taxonomy, the client terminal 120 submits an input search string IS from which it is possible to retrieve such specific concept, e.g., a string corresponding to the concept literal string of the concept.

For example, if an user of the client terminal 120 desires to retrieve the contents stored in the database that are directly classified under the category defined by the concept "war", such input search string IS may be "war".

The submitted input search string IS is used by the exploring server 130 for selecting a specific concept among those listed in the taxonomy table 510. For example, the input search string IS may be used as a hash key adapted to be converted, through a proper hash function implemented by the exploring server 130 and schematically illustrated in FIG. 5 with the functional block 440, into a corresponding taxonomy index ti of the taxonomy table 510.

In the example at issue, the hash function 440 is configured to convert the input search string "war" into the taxonomy index ti="3" identifying the fourth row of the taxonomy table 510, which is associated with the concept "war".

Then, a corresponding set of content indexes ci of the content table 520 is selected exploiting the direct lower bound index dilb and the direct upper bound index diub stored in the row of the content table 510 identified by the retrieved taxonomy index ti. Particularly, such selected set of taxonomy indexes ti is determined by selecting the set of rows of the content-by-taxonomy array 530 whose content-by-taxonomy indexes cti are comprised within the interval defined by dilb and diub −1.

In the example at issue, the fourth row of the taxonomy table 510 identified by the taxonomy index ti="3" has a direct lower bound index dilb equal to "3" and a direct upper bound index diub equal to "5". Thus, the selected set of rows of the content-by-taxonomy array 530 starts from the row whose content-by-taxonomy index cti is equal to dilb="3" and ends to the row whose content-by-taxonomy index cti is equal to diub −1="4".

Finally, the requested contents that are directly classified under the category defined by the concept submitted through the query by the client terminal 120 are retrieved by listing the title literal strings stored in the set of rows of the content table 520 which is identified by the content indexes ci stored in the selected set of rows of the content-by-taxonomy array 530.

In the example at issue, the row of the content-by-taxonomy array 530 identified by the content-by-taxonomy index cti="3" stores the content index ci="0", while the row of the content-by-taxonomy index cti="4" stores the content index ci="4". Thus, the contents that are directly classified under the category defined by the concept "war" are those whose title literal strings are "paths of glory" (ci="0") and "apocalypse now" (ci="4").

The retrieved title literal strings are then provided to the client terminal 120 which has submitted the content query.

In case the retrieved direct lower bound index dilb and direct upper bound index diub are equal to "−1", it means that the submitted concept defines a category under which no content has been classified. In this case, the exploring server 130 may notify the user of the client terminal 120 with a "no results" response.

The above-described operations performed by the exploring server 130 for carrying out a (direct) content query submitted by a client terminal 120 may be reassumed with the following pseudo-code:

```
ti =convert (IS);
if ((taxonomy_table[ti].dilb >= 0) && (taxonomy_table[ti].diub >= 0) {
     for (j = taxonomy_table[ti].dilb; j < taxonomy_bytable[ti].diub;
     j++) {
          content_title =
          content_table[content_by_taxonomy[j]].title.literal
                                                                 }
                                                                      }
else {return "no results"}
``` wherein convert( ) is the function that converts the submitted input search string IS into a corresponding taxonomy index ti of the taxonomy table 510 (e.g., the hash function 440), taxonomy_table[ti].dilb is the direct lower bound index dilb of the row of the taxonomy table 510 identified by the taxonomy index ti, taxonomy_table[ti].diub is the direct upper bound index diub of the row of the taxonomy table 510 identified by the taxonomy index ti, content_by_taxonomy[j] is the content index ci stored in the row of the content-by-taxonomy array 530 identified by the content-by-taxonomy index cti=j and content_table[x].title.literal is the title literal string stored in the content table 520 row identified by the content index ci=x.

Since both the taxonomy table 510 and the content-by-taxonomy array 530 have been generated taking into account that the concept keys have been assigned to the various nodes of the taxonomy tree following a specific tree-traversing algorithm according to which all descendant nodes of the tree are listed contiguously to their corresponding ancestor node, the content query data structures 285 previously described can be also exploited for performing deep content queries. A deep content query is a content query directed to the retrieval of the contents that are classified under a category defined by a specific concept of the taxonomy and at the same time under the categories defined by those concepts corresponding to nodes of the taxonomy tree which are descendant of the node corresponding to such specific concept.

For this purpose, each row of the taxonomy table 510 is configured to store a pair of respective deep bound indexes—namely a deep lower bound index delb and a deep upper bound index deub—to be used in place of the direct lower bound index dilb and the direct upper bound index diub.

The deep lower bound index delb and the deep upper bound index deub are generated in the following way.

The deep lower bound index delb of each row of the taxonomy table 510 identified by a taxonomy index ti is set equal to the lower content-by-taxonomy index cti of the content-by-taxonomy array 530 which identifies a content-by-taxonomy array 530 row corresponding to a concept directly corresponding to such taxonomy index ti or to a concept that corresponds to a node of the taxonomy tree which is a descendant of the node corresponding to the concept associated with such taxonomy index ti. The deep upper bound index deub of each row of the taxonomy table identified by a taxonomy index ti is instead set equal to one plus the higher content-by-taxonomy index cti of the content-by-taxonomy array 530 which identifies a content-by-taxonomy array 530 row corresponding to a concept directly corresponding to such taxonomy index ti or to a concept that corresponds to a node of the taxonomy tree which is a descendant of the node corresponding to the concept associated with such taxonomy index ti.

For example, making reference to the example at issue, the second row of the taxonomy table 510 (ti="1", corresponding to the concept "dramatic"), which has the direct lower bound index dilb equal to "0" and the direct upper bound index diub equal to "2", has the deep lower bound index delb equal to "0"

and the deep upper bound index deub equal to "5". Indeed, the range spanned by such deep bound index pair corresponds to the first five rows of the content-by-taxonomy contents, which correspond in turn to the contents that are directly classified under the category defined by the concept "dramatic" or classified under the categories defined by the concepts that are descendant of such concept, i.e., the concepts "introspective" and "war". Particularly, such contents are "path of glory", "the seventh seal", "il caso mattei" and "apocalypse now".

It has to be appreciated that by carrying out a deep content query with the above-described procedure, possible duplicated contents may be obtained in response. For example, making reference to the example at issue, a deep content query directed to retrieve the contents that are classified under the category defined by the concept "dramatic" returns the content "the seventh seal" two times. Indeed, the content "the seventh seal" is retrieved a first time in the first row of the content-by-taxonomy array 530 (cti=0) and a second time in the third row of the content-by-taxonomy array 530 (cti=2); in the first case, the content "the seventh seal" is classified under the category "dramatic", while in the second case, the content "the seventh seal" is classified under the category "introspective", which corresponds to a node in the tree that is a descendant one of the node corresponding to the content "dramatic".

In order to resolve this drawback, and allow the exploring server 130 to count each duplicated content once, the content-by-taxonomy array 530 is provided with a further column, adapted to store for each row of the array a so-called link index li. Particularly, the link index li stored in the generic row of the content-by-taxonomy array 530 storing a content index ci is set equal to the value of the content-by-taxonomy index cti corresponding to the next row of the content-by-taxonomy array 530 storing the same content index ci; if such row is the last one in the content-by-taxonomy array 530 which stores the content index ci, the link index li is set equal to "−1".

Making reference to the example at issue, the first row of the content-by-taxonomy array 530 (cti=0) storing a content index ci=2 has a link index li equal to "2", because the third row (cti=li=2) as well stores a content index ci=2. Since such third row is the last row of the content-by-taxonomy array 530 which stores the content index ci=2, the corresponding link index li is equal to "−1".

The link indexes li are exploited during a deep content query in the following way. When a row of the content-by-taxonomy array 530 is selected through the content-by-taxonomy index cti range outputted by the taxonomy table 510, a check is made on the corresponding link index li. If the value of such link index li is different than "−1", it means that there exists at least another row of the content-by-taxonomy array 530 storing the same content index ci which is stored in the selected row; otherwise, if the value of such link index li is equal to "−1", it means that such row is the last one in the content-by-taxonomy array 530 that stores such content index ci.

More in detail, a possible subset of instructions performed by the exploring server 130 during such deep content query may be the following one:

```
for (i = delb; i < deub; i++) {
    if ((contents_by_taxonomy[i].linkindex == −1 OR
    (content_by_taxonomy[i].linkindex > deub) )
        collect (content_by_taxonomy[i]. title.literal)
    else <skip> //another occurrence exists in the content-by-taxonomy
    index range
}
``` wherein contents_by_taxonomy[i].linkindex is the link index li of the content-by-taxonomy array 530 row having the content-by-taxonomy index equal to i.

As already mentioned in the introduction of the present document, a generic concept of the taxonomy may be combined with one or more other concepts of the taxonomy through Boolean operators (eg., AND, OR) to obtain the so-called composed concepts.

In order to allow the exploring server 130 to carry out a content query directed to obtain the contents that are classified under a category defined by a composed concept, and at the same time resolve the duplicated content drawback previously described, the content-by-taxonomy array 530 is provided with a still further column, adapted to store for each row of the array a so-called next classification index nxi. The next classification index nxi stored in the generic row of the content-by-taxonomy array 530 storing a content index ci is equal to the taxonomy index ti identifying the next concept in the taxonomy table 510 defining a category under which the content stored in the content table 520 identified by such content index ci is classified. If the next classification index nxi is equal to "−1" it means that the category defined by the content of the taxonomy table 510 is the last one under which such content is classified.

A possible subset of instructions performed by the exploring server 130 for carrying out a content query directed to obtain the contents that are classified under a category defined by a composed concept formed by at least two OR-ed concepts may be the following one:

```
maxEI = max(Tupla);
for (each EI in Tupla) {
    nextEI = next(Tupla);
    if (next_classification_index == −1) ==> getContent;
    else {
        <follow link list>
        if (EI > maxEI) ==> getContent;
        if (EI > nextEI) ==> getContent
        else if (EI == nextEI) <do nothing>; // will be picked up next loop
    }
}
``` wherein with Tupla it is intended an array whose elements El are the concepts which are OR-ed to obtain the composed concept, max( ) is a function that calculates the number of elements of an array, next( ) is a function that allows to point to a next element El of an array, and next_classification_index is the next classification index nxi. In other words, thanks to the fact that both the taxonomy table 510 and the content-by-taxonomy array 530 have been generated taking into account that the concept keys have been assigned to the various nodes of the taxonomy tree following a specific tree-traversing algorithm according to which all descendant nodes of the tree are listed contiguously to their corresponding ancestor node, given a specific concept corresponding to a specific node of tree, the above subset of instructions allows to select the content that is classified under the concept corresponding to the deepest node that is a descendant node of such specific node.

A content query directed to obtain the contents that are classified under a category defined by a composed concept formed by at least two AND-ed concepts can be resolved with a similar solution. Particularly, the AND condition is considered to as true when, the scan count of an element is equal to the number of element of the Tupla (traversing the next occurrence of the same element will give an occurrence count less than the number of element of the Tupla).

Obtaining a precise reduced taxonomy generated in response to AND/OR operations among taxonomy concepts is out of the scope of the present invention; however, the exploring server 130 must be capable of giving an indication of which concepts have to be excluded excluded. Slightly modifying the algorithm above depicted it is possible to collect the concepts referenced by the selected contents exploiting the next classification indexes nxi.

The problem of duplicate contents can also be resolved without exploiting the link indexes li and the next classification indexes nxi.

Particularly, for each content involved in a OR expression it is possible to retrieve the its lower and upper bound indexes. The simplest way to eliminate duplicates using an iterative algorithm is to scan, for each content, the other segments of the content-by-taxonomy-array 530 corresponding to the other concepts involved in the OR expression, as depicted in the following subset of instructions:

```
while (<contents>)
  Tupla[i] = Search(taxonomy_table,<content>);
  while (element in Tupla) {
    set currentElement;
    for (j in <bounds of currentElement>) {
      contentInd = contents_by_taxonomy[j];
      set nextElement;
      while (nextElement) {
        if (contentInd == contents_by_taxonomy [Ind]) found = true
      }
    }
    if (found == false) contentInd is unique;
  }
```

This algorithm may be enhanced using a binary search instead of a linear one, but il also possible to strongly reduce the required numer of iteration by simple observing the structure of data. In each segment addressed by the "direct bounds" each contentInd is unique, and, in each segment, the contentInds are ordered. With these assumptions it is possible to limit the iteractions breaking the loop of the algorithm until the searchedIndex is greater than the currentInd found in the array. The equality means that a duplicate is found, and we can stop the search in the other segments. The unique value is returned when no other occurrences are found. Considering the fact that the contentInds in the single segments are ordered, it is possible to "raise" the lower bounds of each segments at every loop. In fact when in a segment the searchInd "n" is founded at a position "m" it is assured that the next serchInd must be higher than n and that its position in the segment must be higher than m. In this manner, at every loop it is possible to restrict the bounds. This "dinamicity" of the lower bounds may be achieved recoding its locally.

A query regarding a composed concept obtained through an AND expression may be resolvable using a same technique, by only changing the end condition. Particularly, in this case the algorithm exits the loop when the number of occurrence is equal to the number of elements in expression.

These algorithms are suitable only for simple AND/OR expression, that is expressions without parenthesis: in these cases the allocation of intermediate dataset is unavoidable, and so, where complex expression are required, another algorithms may be preferable.

In view of the above, if the number of contents in the database is very high, content queries involving composed concepts may give as result a very large number of duplicated contents. In order to return to the user that had performed the query through a client terminal 120 the exact number of different contents classified under the categories defined by a composed concept, the exploring server 130 must be capable of retrieving the duplicated contents for counting them only one time.

An efficient method to count the contents resulting from a content query involving composed concepts according to an embodiment of the present invention is described below.

Briefly, such method provides to count and store in the internal memory 240 through an hash table the number of contents associated to each concept of the taxonomy, and each possible intersection set of them while storing these contents in the internal memory 240.

Each time a content is classified under a category defined by a new concept:

given the list of the other concepts of the taxonomy defining categories under which such content is already classified, a set of all the possible intersections among the new concept with such other concepts is identified; each element of this set is associated with a cardinality counter;

for each element in this set, the associated cardinality counter is increased by 1.

At the end, after reading all the contents, all the number of each possible intersection set is found and stored in the internal memory 240.

During the generation of the content-by-taxonomy array 530 it is possible to read each duplicated content and find the list of concepts in the taxonomies table 510 defining categories under which such content is classified.

If a content i belong to b1, b2, . . . bn, where bi is a generic concept in the taxonomies table 510, it means also that the content belongs as well to each of the possible intersection set of these concepts. Particularly:

$i \in \{b1, b2, \ldots bn\}$

...

$i \in \{b1, b2, bn\}, \ldots, \{b2, bn-1, bn\}$ $i \in \{b1, b2\}, \ldots, \{b1, bn\}, \{b2, bn\}, \ldots, \{bn-1, bn\}$ $i \in \{b1\}, \{b2\}, \ldots \{bn\}$ where {bi} are the sets of contents that belong to each category defined by a single concept and the {b1, b2, . . . bi} are the contents in the intersection of b1, b2, . . . bi.

If n is the number of selected concepts, b1, b2, b3 . . . bn, it is possible to consider each simple set with just one concept, each set with 2 concepts, with 3 concepts, and so on. It is possible to define:

I k,1={bi} where k=1,2,n is the kth simple set, considering just 1 concept.

In details:

I 1,1={b1}, I 2,1={b2}, n,1={bn}

I k,1={bi,bj} where $$k = 1, 2, \binom{n}{2},$$

is the kth set, considering 2 concepts.

In details:
I 1,2={b1,b2}, I 2,2={b1,b3}, ..., $$I\binom{n}{2},$$
$$1 = \{bn-1, bn\}$$

As far as considering the intersection of all chosen concepts.
I k,n={b1,b2, ... bn} were $$k = \binom{n}{n} = 1$$

is the only set resulting from intersection of all concepts.
In details:
I 1,n={b1,b2, ..., bn}
Each possible intersection set of the n selected concepts at group of i will be:
I k,i={bj, ... b1, ..., bm} where $$k = 1, 2, \ldots \binom{n}{i},$$

is the kth set of all possible combinations of the n concept at group of i.
It is also possible to define:
C(I k,i)=the number of contents in the set: I k,i $$Sm = \sum_{k=1}^{\binom{n}{m}} C(I\ k, m)$$

=the sum of the number of contents in each possible set resulting by the intersection of the n chosen concept in group of m The number of contents resulting in a OR operation of the b1,b2, ... bn concepts is equal to the count of the union set of them without repetitions and can be obtained by:

$$C(b1 \vee b2 \vee \ldots \vee bn) = \sum_{i=1}^{n} (-1)^{i+1} Si = \sum_{i=1}^{n} (-1)^{i+1} \sum_{k=1}^{\binom{n}{i}} C(I\ k, i)$$

That is:

$$C(b1 \vee b2 \vee \ldots \vee bn) = \sum_{k=1}^{n} C(I\ k, 1) -$$
$$\sum_{k=1}^{\binom{n}{2}} C(I\ k, 2) + \ldots + (-1)^{i+1} \sum_{k=1}^{\binom{n}{i}} C(I\ k, i) + \ldots + (-1)^{n+1} C(I$$

The number of contents resulting in a AND operation of the b1, b2, b3, ..., bn, taxonomy concepts is equal to the count of the single intersection set of them and can be obtained by:

C(b1 ∧ b2 ∧ ... ∧ bn)=C(I 1,n)

The AND formula is simple and doesn't require a demonstration because by definition the intersection set doesn't have repetition, so each content in it is counted just one time.

The OR formula is useful to count each concept resulting in the union set of b1, b2, b3, ..., bn, just one time, independently of the number of repetition of each of them, in the single bi sets and in each possible intersection sets, as resulting by the following demonstration.

The formula adds the number of contents in each bi set, resulting by all possible combination of the b1, b2, ..., bn concepts in group of 1 (note the number of contents of each set can also be obtained by the difference between the direct index bounds diub and dilb of the taxonomy table 510.

In this sum each content with repetition is counted more that one times as described below:

The contents without repetitions are added just $$\binom{1}{1} = 1 \text{ time.}$$

The contents with 1 repetition (the contents contained in 2 concepts) are added $$\binom{2}{1} = 2 \text{ times.}$$

The contents with 2 repetitions (the contents contained in 3 concepts) are added $$\binom{3}{1} = 3 \text{ times.}$$

In general, the contents with i−1 repetitions (the contents contained in i concepts) are added $$\binom{i}{1} = i \text{ times,}$$

in other words they are added a number of times as the possible combination of the i concepts in group of 1.

The contents with n−1 repetitions (the contents contained in n concepts), are added $$\binom{n}{1} = n \text{ times.}$$

At the next step, the formula subtracts the sum of the number of contents in each of the set intersection of the n concepts at groups of 2, that is:

The contents with 2 repetitions (the contents contained in 3 concepts) are subtracted $$\binom{2}{2} = 1 \text{ time.}$$

The contents with 2 repetitions (the contents contained in 3 concepts) are subtracted $$\binom{2}{2} = 1 \text{ time.}$$

The contents with 3 repetitions (the contents contained in 4 concepts) are subtracted $$\binom{3}{2} = 3 \text{ times.}$$

In general, the contents with i−1 repetitions (the contents contained in i concepts) are subtracted $$\binom{i}{2} \text{ times,}$$

in other words they are subtracted a number of times as the possible combination of the i concepts at group of 2.

As last, the contents with n−1 repetitions (the contents contained in n concepts), are added $$\binom{n}{2} \text{ times.}$$

At the next steps, the formula adds the number of contents in each of the possible set intersection of the n concepts in groups of 3. So at the generic ith step:

If i is odd, the contents with i−1 repetitions (the contents contained in i concepts) are added $$\binom{i}{i} \text{ times.}$$

If i is even, the contents with i−1 repetitions (the contents contained in i concepts) are added $$\binom{i}{i} \text{ times.}$$

The contents with n−1 repetitions (the contents contained in n concepts) are added if i is odd, or subtracted if i is even, $$\binom{n}{i} = n \text{ times,}$$

in other words a number of times as the possible combination of the n concepts at group of i.

Considering all the additions and subtractions done at a ith steps, the contents with i−1 repetitions will be counted the following number of time:

$$\binom{i}{1} - \binom{i}{2} + \binom{i}{3} + \ldots + (-1)^{j+1}\binom{i}{j} + \ldots + (-1)^{i+1}\binom{i}{i} = 1$$

number of times counted the contents with i−1 repetitions (the contents contained in i taxonomy concepts).

After nth step the situation will be:

$$\binom{1}{1} = 1,$$

the number of times that the contents without repetition are counted.

$$\binom{2}{1} - \binom{2}{2} = 1,$$

the number of times that the contents with 1 repetition are counted.

$$\binom{3}{1} - \binom{3}{2} + \binom{3}{3} = 1,$$

the number of times that the contents with 2 repetitions are counted.

$$\binom{i}{1} - \binom{i}{2} + \ldots + (-1)^{j+1}\binom{j}{i} + \ldots + (-1)^{i+1}\binom{i}{i} = 1,$$

the number of contents that the items with i−1 repetitions are counted.

$$\binom{n}{1} - \binom{n}{2} + \binom{n}{3} + \ldots + (-1)^{n+1}\binom{n}{i} + \ldots + (-1)^{n+1}\binom{n}{n} = 1,$$

the number of times that the contents with n−1 repetitions are counted.

Each content in the b1∧b2∧ . . . ∧bn set is counted one and just one time as expected and required in order to count the content in the OR operation.

Given a generic set A={b1, b2, . . . bn} and a generic intersection set B=$b_i$I $b_j$ . . . I $b_k$ where $b_i, b_j, b_k \in A$, the use of the above illustrated formulas supposes that the cardinality of B, C(B) is a known data.

Since the number of the possible sets B dramatically grows with the number of the element contained in A, a problem arise when trying to store in memory a so huge amount of data. The following example will clarify the problem.

Let be a taxonomy formed by 50 concepts. Here follows the number of intersection sets for different orders (i.e., the number of sets forming the intersection).

| Order | Number of possible intersection sets |
|---|---|
| 2 | 1.23E+03 |
| 3 | 1.96E+04 |
| 4 | 2.30E+05 |
| 10 | 1.03E+10 |
| 20 | 4.71E+13 |
| 25 | 1.26E+14 |

From the table above, it is clear that storing in the internal memory 240 the cardinality of all the intersection sets of order 10, could be an excessive burden for the exploring server 130.

According to an embodiment of the present invention, an algorithm is proposed to statistically estimate the cardinality of a generic intersection set.

Let be:
U=the content universe set, and
R=average number of classification of a generic content,
the probability a generic element of the universe i belongs to set A is $$P\langle i \in A \rangle = \frac{C(A)}{R * C(U)}$$

The probability a generic element of the universe i belongs to set A, B . . . S is (statistically independent events)

$$P\langle i \in A, i \in B, \ldots i \in S \rangle =$$

$$\frac{C(A)}{R*C(U)} * \frac{C(B)}{R*C(U)} * \frac{C(S)}{R*C(U)} = \prod_{i=A,B,\ldots}^{i=S} \frac{C\langle i \rangle}{C\langle U \rangle * R}$$

So an estimate of the cardinality of a generic set intersection set AI BI . . . S will be $$AIBI\ldots S = C\langle U \rangle * R \prod_{i=A,B,\ldots}^{i=S} \frac{C\langle i \rangle}{C\langle U \rangle * R}$$

Depending on implementation issues and other considerations, the proposed algorithm could store in the internal memory 240 during a loading phase the correct count of the cardinality of the intersection sets of low order, while calculating runtime an estimate of the cardinality of the intersection sets of higher order.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, even if reference has been made to databases in which digital information contents are hierarchically classified under categories defined by taxonomic concepts, similar considerations apply to database adapted to store a first collection of items (e.g., customers) and a second collection of items (e.g., suppliers), wherein each item of the first collection may be in a relationship with one or more items of the second collection, and vice versa.

The invention claimed is:

1. A method for carrying out, by a data processing system, searches in a database comprising a first plurality of first data items and a second plurality of second data items, wherein the database is structured to enable a generic first data item to be in relationship with one or more of the second data items and to enable a generic second data item to be in relationship with one or more of the first data items, the method comprising:

based on the database, generating in an internal memory of the data processing system at least one of a first data table structure or a second data table structure, the at least one of the first data table structure or the second data table structure comprising:

a first data table comprising a first plurality of elements, each of the first plurality of elements corresponding to a respective first data item, and the first plurality of elements of the first data table being univocally identified by a respective first index;

a second data table comprising a second plurality of elements, each of the second plurality of elements corresponding to a respective second data item, and the second plurality of elements of the second data table being univocally identified by a respective second index; and a third data table comprising a third plurality of elements, each of the third plurality of elements being in a univocal relationship with a respective element of the first data table and in a univocal relationship with another respective element of the second data table;

receiving a search string comprising an identifier of a first data item or of a second data item; and if the search string comprises the identifier of the first data item, accessing at least one element of the first data table based on the search string;

accessing at least one element of the third data table corresponding to the at least one accessed element of the first data table, and retrieving, from the at least one accessed element of the third data table, a second index of at least one corresponding element of the second data table; and accessing the second data table using said second index for extracting a search result, or if the search string comprises the identifier of the second data item:

accessing at least one element of the second data table based on the search string;

accessing at least one element of the third data table corresponding to the at least one accessed element of the second data table, and retrieving, from the at least one accessed element of the third data table, a first index of at least one corresponding element of the first data table; and accessing the first data table using said first index for extracting a search result, wherein said accessing the at least one element of the first data table or of the second data table based on the search string comprises converting said search string into at least one corresponding index of the at least one element of the first data table or of the second data table, respectively, based on a hash function.

2. The method of claim 1, wherein the database is structured in such a way that the second plurality of the second data items are hierarchically arranged.

3. The method of claim 2,
wherein each of the third plurality of elements of the third data table is univocally identified by a corresponding third index,
wherein:
if the search string comprises the identifier of the first data item, each of the first plurality of elements of the first data table comprises at least one respective bound index corresponding to a set of third indexes, or
if the search string comprises the identifier of the second data item, each of the second plurality of elements of the second data table comprises at least one respective bound index corresponding to a set of third indexes, and
wherein said accessing the at least one element of the third data table corresponding to the at least one accessed element of the first or second data tables comprises accessing the third plurality of elements of the third data table whose third indexes correspond to the at least one respective bound index of the at least one accessed element of the first or second data tables.

4. The method of claim 3, wherein:
the first data items are digital information contents, and
each second data item defines a respective category of a taxonomic classification, the database being structured to enable a generic information content to be classified under one or more categories of the taxonomic classification.

5. The method of claim 4,
wherein said database comprises:
a content table comprising a first ordered sequence of elements, each of the first ordered sequence of elements corresponding to a respective digital information content;
a taxonomy table comprising a second ordered sequence of elements, each of the second ordered sequence of elements corresponding to the respective category of the taxonomic classification; and
a classification table comprising a third ordered sequence of elements, each of the third ordered sequence of elements comprising an indication of an element of the content table and another indication of another element of the taxonomy table, and
wherein said generating the at least one of the first data table structure or the second data table structure based on a data structure comprises:
generating the first data table based on the content table,
generating the second data table based on the taxonomy table, and
generating the third data table based on the classification table.

6. The method of claim 5, wherein each of the first plurality of elements of the first data table is generated based on a respective element of the content table according to the first ordered sequence.

7. The method of the claim 5, wherein each of the second plurality of elements of the second data table is generated based on a respective element of the taxonomy table according to the second ordered sequence.

8. The method of claim 1, wherein the database is stored in an external memory of the data processing system.

9. A data processing system comprising:
an external memory capable of being adapted to store a database comprising a first plurality of first data items and a second plurality of second data items, wherein the database is structured to enable a generic first data item to be in relationship with one or more of the second data items and to enable a generic second data item to be in relationship with one or more of the first data items; and
an internal memory capable of being adapted to store at least one of a first data table structure or a second data table structure based on the database, the at least one of the first data table structure or the second data table structure comprising:
a first data table comprising a first plurality of elements, each of the first plurality of elements corresponding to a respective first data item, and the first plurality of elements of the first data table being univocally identified by a respective first index;
a second data table comprising a second plurality of elements, each of the second plurality of elements corresponding to a respective second data item, and the second plurality of elements of the second data table being univocally identified by a respective second index; and
a third data table comprising a third plurality of elements, each of the third plurality of elements being in a univocal relationship with a respective element of the first data table and in a univocal relationship with another respective element of the second data table,
wherein the data table processing system is configured to receive a search string comprising an identifier of a first data item or of a second data item, and to
if the search string comprises the identifier of the first data item,
access at least one element of the first data table based on the search string,
access at least one element of the third data table corresponding to the at least one accessed element of the first data table, and retrieve, from the at least one accessed element of the third data table, a second index of at least one corresponding element of the second data table, and
access the second data table using said second index for extracting a search result,
or, if the search string comprises the identifier of the second data item:
access at least one element of the second data table based on the search string,
access at least one element of the third data table corresponding to the at least one accessed element of the second data table, and retrieve, from the at least one accessed element of the third data table, a first index of at least one corresponding element of the first data table, and
access the first data table using said first index for extracting a search result, and
wherein accessing the at least one element of the first data table or of the second data table based on the search string comprises converting said search string into at least one corresponding index of the at least one element of the first data table or of the second data table, respectively, based on a hash function.

10. A method for carrying out, by a data processing system, searches in a database comprising a first plurality of first data items and a second plurality of second data items, wherein the database is structured to enable a generic first data item to be in relationship with one or more of the second data items and to enable a generic second data item to be in relationship with one or more of the first data items, the method comprising:

based on the database, generating in an internal memory of the data processing system at least one of a first data table structure or a second data table structure, the at least one of the first data table structure or the second data table structure comprising:

a first data table comprising a first plurality of elements, each of the first plurality of elements corresponding to a respective first data item, and the first plurality of elements of the first data table being univocally identified by a respective first index;

a second data table comprising a second plurality of elements, each of the second plurality of elements corresponding to a respective second data item, and the second plurality of elements of the second data table being univocally identified by a respective second index; and a third data table comprising a third plurality of elements, each of the third plurality of elements being in a univocal relationship with a respective element of the first data table and in a univocal relationship with another respective element of the second data table;

receiving a search string comprising an identifier of a first data item or of a second data item; and if the search string comprises the identifier of the first data item, accessing at least one element of the first data table based on the search string;

accessing at least one element of the third data table corresponding to the at least one accessed element of the first data table, and retrieving, from the at least one accessed element of the third data table, a second index of at least one corresponding element of the second data table; and accessing the second data table using said second index for extracting a search result, or if the search string comprises the identifier of the second data item:

accessing at least one element of the second data table based on the search string;

accessing at least one element of the third data table corresponding to the at least one accessed element of the second data table, and retrieving, from the at least one accessed element of the third data table, a first index of at least one corresponding element of the first data table; and accessing the first data table using said first index for extracting a search result, wherein the database is structured in such a way that the second plurality of the second data items is hierarchically arranged, wherein each of the third plurality of elements of the third data table is univocally identified by a corresponding third index, wherein:

if the search string comprises the identifier of the first data item, each of the first plurality of elements of the first data table comprises at least one respective bound index corresponding to a set of third indexes, or if the search string comprises the identifier of the second data item, each of the second plurality of elements of the second data table comprises at least one respective bound index corresponding to a set of third indexes, and wherein said accessing the at least one element of the third data table corresponding to the at least one accessed element of the first or second data tables comprises accessing the third plurality of elements of the third data table whose third indexes correspond to the at least one respective bound index of the at least one accessed element of the first or second data tables.

* * * * *